(No Model.)
C. H. STRADLEY.
FARM OR GARDEN GATE.
No. 596,189. Patented Dec. 28, 1897.
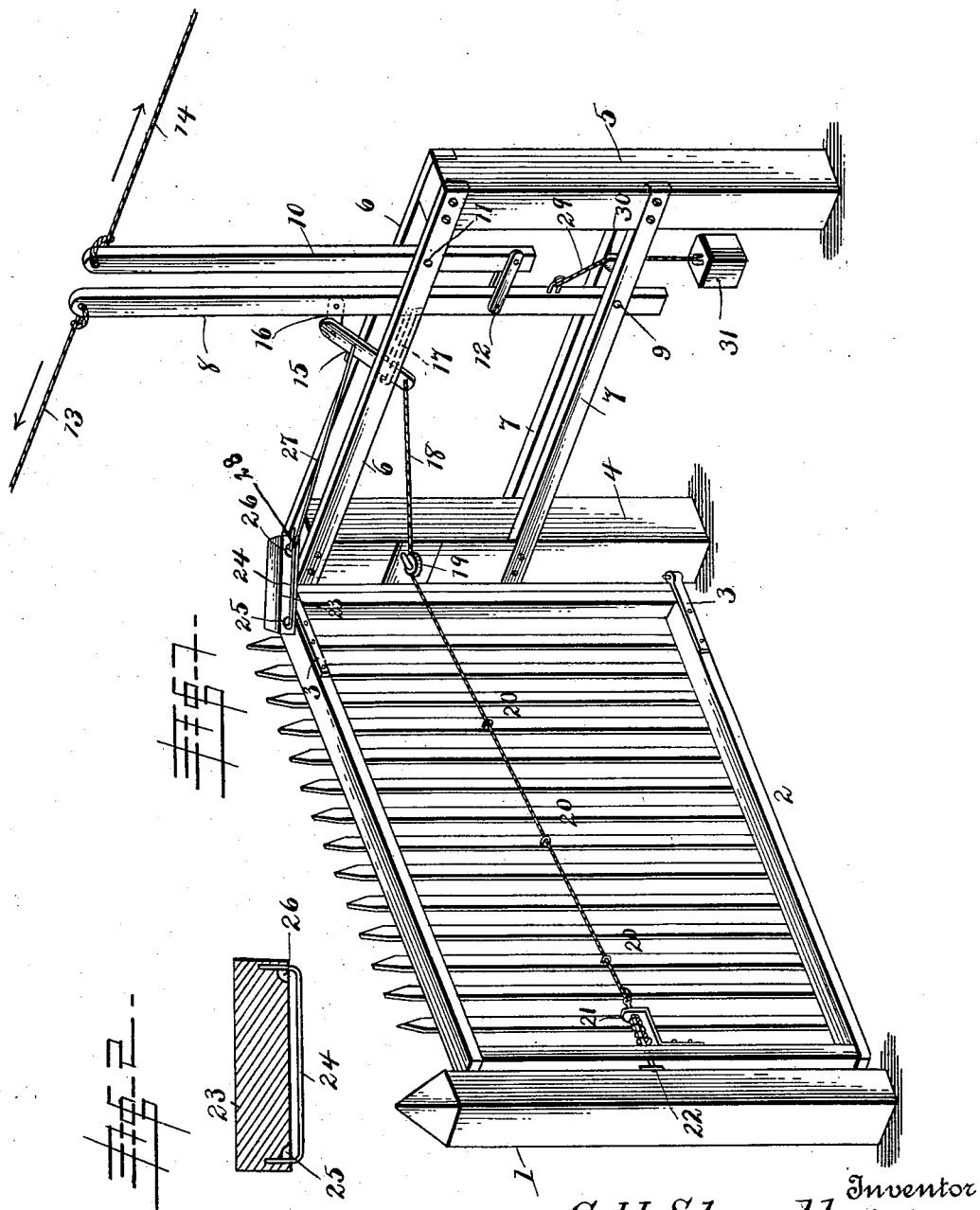
Witnesses
W. E. Borren
J. A. Wilson
Inventor
C. H. Stradley:—
by H. B. Wilson
Attorney

UNITED STATES PATENT OFFICE.

CHARLEY H. STRADLEY, OF WARRENTON, ILLINOIS.

FARM OR GARDEN GATE.

SPECIFICATION forming part of Letters Patent No. 596,189, dated December 28, 1897.

Application filed June 15, 1897. Serial No. 640,835. (No model.)

*To all whom it may concern:*

Be it known that I, CHARLEY H. STRADLEY, a citizen of the United States, residing at Warrenton, in the county of Edgar and State of Illinois, have invented certain new and useful Improvements in Farm or Garden Gates; and I do declare the following to be a full, clear, and exact description of the invention, such as will enable others skilled in the art to which it appertains to make and use the same.

My invention relates to improvements in farm or garden gates; and the object is to provide a simple, inexpensive, and efficient gate that can be opened and closed by a person in a vehicle or mounted and at a distance from the gate.

To this end the novelty consists in the construction, combination, and arrangement of the same, as will be hereinafter more fully described, and particularly pointed out in the claims.

In the accompanying drawings the same reference-characters indicate the same parts of the invention.

Figure 1 is a perspective view of my improved gate as it appears in operation. Fig. 2 is a horizontal section of the gate-operating arm.

1 represents the fence-post; 2, the gate-panel, which is vertically pivoted by the strap-hinges 3 3 to the fixed post 4, so as to permit a horizontal movement of the gate-panel of about a quarter of a circle.

5 represents a post fixed in the ground a suitable distance from the fixed post 4 and at a right angle to the line of fencing, and it is connected to said post 4 at its upper end by a pair of parallel guide-bars 6 6 and lower down with a second pair of parallel guide-bars 7 7.

8 represents a vertical lever fulcrumed on a bolt 9, fixed in the bars 7 7, and it extends upward and has a free movement between the upper pair of guide-bars 6 6.

10 represents a second vertical lever fulcrumed on the bolt 11 between the bars 6 6, and its lower end is connected to the lever 8 by a pivoted strap 12.

13 and 14 represent cords or cables extending in opposite directions from the upper free ends of the levers 8 and 10, respectively.

15 represents a depending lever fulcrumed on the projecting end of a bar 16, fixed in the lever 8, and it extends downward through a guide-bracket 17 on said lever, and its lower end is connected to a cord 18, which passes around a grooved guide-pulley 19, journaled on the post 4, thence through guide-staples 20 20, fixed on the gate-panel, and its end is connected to a spring-actuated bolt-latch 21, fixed at the free end of the gate-panel and arranged automatically to engage the keeper 22 on the fence-post 1.

23 represents a horizontal cross-bar fixed diagonally to the rear end of the gate-panel and centrally above the vertical line of the hinges, which form the pivotal line of the gate.

24 represents a parallel guide-rod fixed to said bar, and 25 and 26 represent notches formed in said bar at the ends of the guide-rod.

27 represents a connecting-rod, the end 28 of which encompasses said guide-rod 24 with sufficient play to allow said end 28 to slide freely along the guide-rod from end to end and at the same time to engage the notches 25 and 26 in the diagonal bar 23 when said rod is pushed forward and to release itself from the same when it is drawn backward. The opposite end of said rod 27 is pivoted to the depending lever 15, as shown.

29 represents a cord having one end fixed to the lower end of the lever 8 a short distance above its fulcrum-point. It extends over a grooved guide-pulley 30, mounted between the parallel bars 7 7, and its depending end is fixed to a counterbalance-weight 31.

The operation of the device is as follows: When a person approaches the gate from the direction in which the cord 13 extends, the cord 13 is pulled, which draws the lever 8 forward. This movement carries the depending lever 15 with it, but as the forward end of the connecting-rod 27 engages the notch 26 in the bar 23 the rear end of said rod 27 acts as a fixed fulcrum-point for said lever 15, which forces its lower end backward against the lever 8. This movement of the lower end of the lever 15 is communicated to the latch-bolt 21 through the medium of the cord 18, which withdraws said bolt and releases the gate.

The gate being now released, the continued pressure on the lever 8 is transmitted to the outer end of the bar 23 by the rod 27 engaging the notch 26 in said bar, which forces that end of the bar forward, and consequently swings the gate backward and away from the direction in which the person is approaching. As soon as the cord 13 is released the weight 31 draws the lever 8 backward, and in doing so the rod 27 is withdrawn from the notch 26 and it slides along the rod 24 to the opposite end thereof and in line with the notch 25 in the opposite end of the bar 23, which is on the opposite or inside of the pivotal line of the gate. The party having passed through the gate now draws the cord 14, which pulls the upper end of the lever 10 rearward, and its lower end through the strap 12 forces the lever 8 forward or in the same direction in which it was originally operated to open the gate, but as the end of the rod 27 now engages the bar 23 at its opposite end and on the inside of the pivotal line of the gate the same movement of the lever 8 swings the gate to and closes it.

It will thus be seen that when the gate is closed and either cord 13 or cord 14 is pulled the gate will open, and when open and either cord is pulled the gate will close.

Although I have specifically described the construction and relative arrangement of the several elements of my invention, I do not desire to be confined to the same, as such changes or modifications may be made as clearly fall within the scope of my invention without departing from the spirit thereof.

Having thus fully described my invention, what I claim as new and useful, and desire to secure by Letters Patent of the United States, is—

1. The vertically-hinged gate-panel 2, the cross-bar 23, diagonally fixed to said panel so as to extend on each side of its pivotal line, and provided with the notches 25 26, the guide-rod 24 fixed to the cross-bar, and the rod 27 connected at one end to said guide-rod, and means as described for operating said rod 27 from either side of the gate-panel as and for the purpose set forth.

2. The vertically-hinged gate-panel 2, the cross-bar 23, diagonally fixed to said panel so as to extend on each side of its pivotal line, and provided with the notches 25 26, the guide-rod 24 fixed to the cross-bar, and the rod 27 connected at one end to said guide-rod, in combination with the vertical lever 8, and the depending lever 15 fulcrumed thereto and connected to the rod 27, substantially as and for the purpose set forth.

3. The vertically-hinged gate-panel 2, the cross-bar 23, diagonally fixed to said panel so as to extend on each side of its pivotal line, and provided with the notches 25 26, the guide-rod 24 fixed to the cross-bar, and the rod 27 connected at one end to said guide-rod, in combination with the vertical lever 8, the depending lever 15 fulcrumed thereon and connected to said rod 27, the latch-bolt 21, the cord 18 connecting said lever 15 with said bolt 21, and the counterbalance-weight 31 connected to said lever 8, substantially as and for the purpose set forth.

4. The vertically-hinged gate-panel 2, the cross-bar 23, diagonally fixed to said panel so as to extend on each side of its pivotal line, and provided with the notches 25 26, the guide-rod 24 fixed to the cross-bar, and the rod 27 connected at one end to said guide-rod, in combination with the vertical lever 8, the depending lever 15 fulcrumed thereon and connected to said rod 27, the latch-bolt 21, the cord 18 connecting said lever 15 with said bolt 21, the counterbalance-weight 31 connected to said lever 8, and the vertical lever 10 connected to said lever 8 by the strap 12, substantially as and for the purpose set forth.

In testimony whereof I hereunto affix my signature in presence of two witnesses.

CHARLEY H. STRADLEY.

Witnesses:
JAMES HAUGH,
W. P. HORTON.